United States Patent [19]

Morii et al.

[11] Patent Number: 4,570,093
[45] Date of Patent: Feb. 11, 1986

[54] DIRECT-CURRENT MOTOR WITH TWO DRIVE MAGNETS

[75] Inventors: Yoshihiro Morii; Teruaki Kitamori; Masanori Morisawa, all of Osaka, Japan

[73] Assignee: Matsushita Electric Industrial Co., Ltd., Osaka, Japan

[21] Appl. No.: 616,303

[22] Filed: Jun. 1, 1984

[30] Foreign Application Priority Data

Jun. 2, 1983 [JP] Japan .................. 58-98339

[51] Int. Cl.⁴ .......................... H02K 21/24
[52] U.S. Cl. ................ 310/46; 310/67 R; 310/154; 310/268
[58] Field of Search ............ 310/46, 154, 268, 67, 310/154, 268

[56] References Cited

U.S. PATENT DOCUMENTS 3,426,224  2/1969  Esters .................... 310/154
3,467,845  9/1969  Wesolowski ............ 310/268
4,114,057  9/1978  Esters .................... 310/46
4,488,076 12/1984  MacLeod ............... 310/171

FOREIGN PATENT DOCUMENTS 48-6323   2/1973  Japan .
49-34082  9/1974  Japan .

Primary Examiner—Peter S. Wong
Assistant Examiner—D. L. Rebsch
Attorney, Agent, or Firm—Lowe, King, Price & Becker

[57] ABSTRACT

A direct-current motor includes a rotatable shaft, a core mounted on the rotatable shaft and supporting windings disposed around the core, the core having winding-free portions, a first drive magnet disposed in radially confronting relation to the winding-free portions with an air gap, and magnetized substantially perpendicularly to the rotatable shaft, and a second drive magnet disposed in axially confronting relation to the winding-free portions with an air gap, and magnetized substantially axially of the rotatable shaft.

10 Claims, 11 Drawing Figures

DIRECT-CURRENT MOTOR WITH TWO DRIVE MAGNETS

BACKGROUND OF THE INVENTION

The present invention relates to a direct-current motor for use in magnetic disk drives, video tape recorders, casstte tape recorders, and various other motor-operated devices for home, office and industrial use.

The recent trend of magnetic disk drives is toward a lower-profile configuration, and so is the trend of direct-current motors for driving such devices. However, direct-current motors are also required to have high-speed starting characteristics. Other devices such as information-related devices other than magnetic disk drives also have a tendency toward a lower profile, and direct-current motors used therein are required to be reduced in thickness and have high-speed starting characteristics.

FIGS. 1 and 2 of the accompanying drawings show a conventional direct-current motor for use in magnetic disk drives, the illustrated direct-current motor having a rotor assembly and a stator assembly which are disposed in radially confronting relation to each other. The rotor assembly, generally designated I, is composed of a rotatable shaft 1, a turntable 2 fixed to the rotatable shaft 1, an attachment boss 3 secured to the rotatable shaft 1 remotely from the turntable 2, a cup-shaped rotor yoke 4 attached to the attachment boss 3, and a drive magnet 5 fixed to an inner peripheral wall surface of the rotor yoke 4. The drive magnet 5 is magnetized radially perpendicularly to the rotatable shaft 1. The stator assembly, generally designated II, is disposed radially inwardly of the drive magnet 5 in spaced relation thereto. The stator assembly II is composed of a laminated stator core 6 having a plurality of circumferentially spaced teeth or pole pieces 6a and a plurality of radial yokes 6b interconnecting the pole pieces 6a, and stator windings 7 coiled respectively around the radial yokes 6b of the stator core 6. The stator assembly II is fixed to a housing assembly III composed of a pair of axially spaced bearings 8, 9 by which the rotatable shaft 1 is rotatably supported, and a housing 10 accommodating the bearings 8, 9 therein and supporting the stator assembly II. A printed-circuit board 11 is attached to the housing assembly III and serves to install a position detector and a speed detector thereon and connect the stator windings.

FIG. 3 of the accompanying drawings illustrates another prior direct-current motor in which a rotor assembly I and a stator assembly II are disposed in axially confronting relation to each other. The rotor assembly I comprises a rotatable shaft 1, a turntable 2 fixed to the rotatable shaft 1, an attachment boss 3 secured to the rotatable shaft 1 remotely from the turntable 2, a cupshaped rotor yoke 4 attached to the attachment boss 3, and a drive magnet 5 fixed to an inner peripheral wall surface of the rotor yoke 4. The drive magnet 5 is magnetized axially parallel to the rotatable shaft 1.

The stator assembly II is constructed of a stator yoke 6', a printed-circuit board 11 fixed to the stator yoke 6', and stator windings 7 fixed to the printed-circuit board 11. The stator assembly II is mounted on a housing assembly III composed of a pair of axially spaced bearings 8, 9 and a housing 10.

In the direct-current motors illustrated in FIGS. 1, 2 and 3, a signal indicative of the angular position of the rotor assembly I is detected by a Hall-effect device, for example, which controls a current flowing through the stator windings to rotate the rotor assembly I.

With the direct-current motor construction shown in FIG. 1, the air gap between the stator core 6 and the drive magnet 5 can be selected to be about 0.5 mm with high mechanical accuracy. Therefore, the operating point of the magnetic circuit is normally high at a permeance ranging from 5 to 10 G/Qe. Since ring-shaped anisotropic ferrite magnets are poorer in characteristics and much expensive than isotropic ferrite magnets, the drive magnet 5 normally comprises a ring-shaped isotropic ferrite magnet.

Where the motor of FIGS. 1 and 2 has a height greater than a certain level, the permeance is large and hence a large starting torque can be obtained, and the motor is manufactured inexpensively. However, where the motor is to be of a lower profile, any reduction in the motor height will result directly in a reduction in the thickness of the stator core 6 since coil end heights A, B of the stator windings 7 remain substantially unchanged. For reducing the thickness of a direct-current motor having a motor height of 10 mm and a stator core thickness of 3 mm so that the motor height will be reduced 10% to 9 mm, the thickness of the stator core 6 has to be reduced about 30% to 2 mm. This is disadvantageous in that motor regulation (ratio of change of rotation per unit torque, larger motors have smaller values of motor regulation), which is one of main characteristics representative of the volumetric efficiency of the motor, is doubled, and the volumetric efficiency of the motor is reduced to about half.

According to the motor arrangement of FIG. 3, the area of flux interlinkage on the stator windings 7 is much larger than that in the motor arrangement shown in FIGS. 1 and 2, the area of flux interlinkage remaining substantially unchanged even if the motor is reduced in thickness. As a consequence, unlike the motor shown in FIGS. 1 and 2, the motor of FIG. 3 is not subjected to a reduced volumetric efficiency due to a reduced motor thickness. However, since the air gap between the drive magnet 5 and the stator yoke 6' is large, the operating point of the magnet circuit is selected to be a small permeance ranging from 0.8 to 1.5 G/Qe, for drawing a maximum amount of energy from the magnet 5. The drive magnet 5 is normally composed of an anisotropic magnet, since the magnet 5 is axially magnetized, and a disk-shaped anisotropic ferrite magnet can be fabricated relatively inexpensively.

With the conventional motor constructions as illustrated in FIGS. 1, 2 and 3, where the drive magnet 5 comprises a rare-earth magnet having a large energy product, the flux linkage across the stator windings 7 is increased and the torque generated per unit current is increased, so that the starting characteristics and volumetric efficiency of the motor are improved. However, the cost of the motor is increased at a much higher rate.

In the motor shown in FIG. 1, the drive magnet 5 is secured to the inner wall surface of the rotor yoke 4 and may be small in volume, so that the rotor assembly I has a relativley small inertia. Where the motor of FIG. 1 is reduced in thickness, however, the starting characteristics become poorer or the time required to get the motor started is longer since the volumetric efficiency is reduced, that is, the produced torque is much smaller. This problem becomes quite serious in case the motor is incorporated in information-related devices. In the motor illustrated in FIG. 3, the produced torque is not so greatly reduced as by the motor of FIG. 1 when the motor is reduced in thickness. However, since the operating point of the magnetic circuit is essentially low, the torque generated per unit volume of the drive magnet 5 is small, and hence the volume of the drive magnet 5 has to be increased in order to produce a desired amount of torque. This results in a larger inertia of the rotor assembly I and poorer starting characteristics.

There is known anther direct-current motor, as disclosed by Japanese Patent Publications Nos. 48-6323 and 49-34082, which has an armature having radial winding slots defined in opposite surfaces of an annular main core and communiating with each other across an outer peripheral edge of the main core, and three sets of field magnets disposed annularly so that they confront the outer peripheral edge and opposite side surfaces of the armature core and have polarities arranged in the same manner in the radial direction. According to the disclosed direct-current motor, the hypothetical surface area of flux linkage on the stator core and the magnets are about twice that in the motor shown in FIG. 1. For achieving a maximum output with the same volume of the motor, the actual effective area of flux linkage on the pole pieces and the magnets ranges from about $\frac{1}{2}$ to $\frac{1}{3}$ of that in the motor of FIG. 1 with the space factor of the armature windings being taken into account. Although the actual effective area of flux linkage of the disclosed motor is better than that in printed motors, nevertheless the armature windings are difficult to form, and no substantial increase in the volumetric efficiency can be achieved by the disclosed motor arrangements. In order to accomplish the stator core of the disclosed shape, it has to be molded usually of a material such as soft ferrite, and therefore a high iron loss is caused, unlike the motor of FIG. 1 in which insulated silicon steel plates are employed. In use, the disclosed motor consumes a large amount of current, has a greatly reduced output efficiency, becomes heated, and thus is not suitable for use in portable devices powered by batteries. Another problem is that, since the magnets are required to be disposed in surrounding relation to the stator yoke in three directions with like polarities facing each other, it is difficult to assemble the magnets because of repulsive forces from like polarities. In the case of a rotatable magnet arrangement, it is difficult to hold the magnets, and no uniform air gap is ensured, and attractive forces between the upper and lower magnets and the stator yoke are subjected to variations. Where an axial thrust bearing is employed, the shaft tends to move upwardly or downwardly, and the motor suffers from vibrations during operation.

The prior direct-current motors have therefore failed to meet requirements as to volumetric efficiency, starting characteristics, input/output conversion efficiency, and other characteristics required by information-related devices.

SUMMARY OF THE INVENTION

It is an object of the present invention to provide a low-profile direct-current motor having a magnetic circuit of a high operating point, a low-inertia rotor, and another magnetic circuit of a high operating point in which a rotor and a stator axially confront each other, for achieving a high volumetric efficiency and a high-speed starting capability.

According to the present invention, there is provided a direct-current motor having a rotatable shaft, a first drive magnet magnetized perpendicularly to the rotatable shaft for producing magnetic flue in a radial direction, and a second drive magnet magnetized axially of the rotatable shaft for producing magnetic fluxes in an axial direction. This arrangement makes the motor low in profile while maintaining a high-speed starting capability thereof.

BRIEF DESCRIPTION OF THE DRAWINGS

The present invention will be described in detail by way of illustrative example with reference to the accompanying drawings, in which.

DETAILED DESCRIPTION

Figure 2:
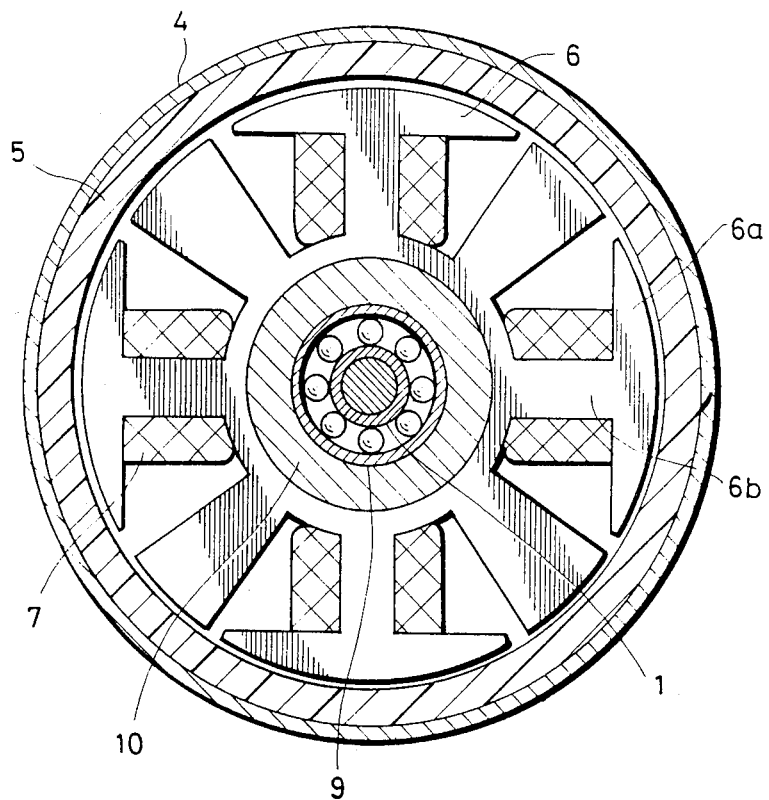
FIG. 2 is a cross-sectional view taken along line C—C' of FIG. 1.
Figure 3:
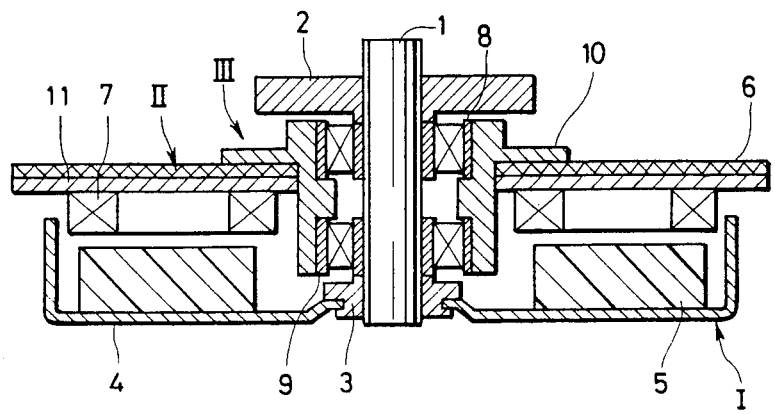
FIG. 3 is an axial cross-sectional view of another conventional direct-current motor.
Figure 4:
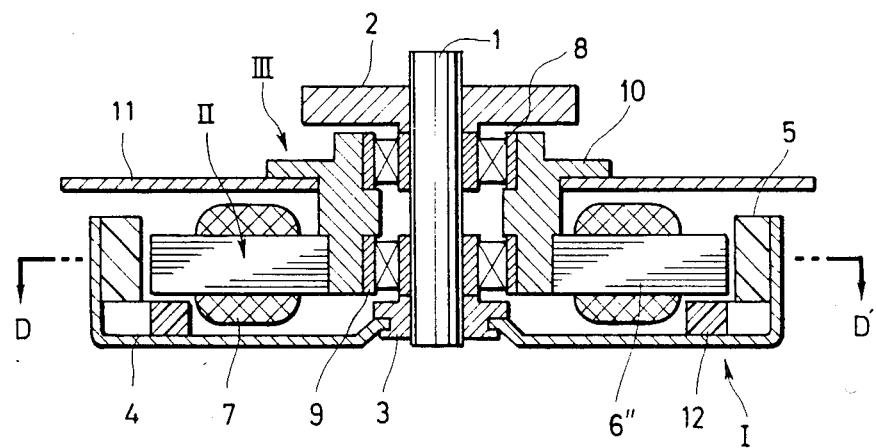
FIG. 4 is an axial cross-sectional view of a direct-current motor according to an embodiment of the present invention.
Figure 5:
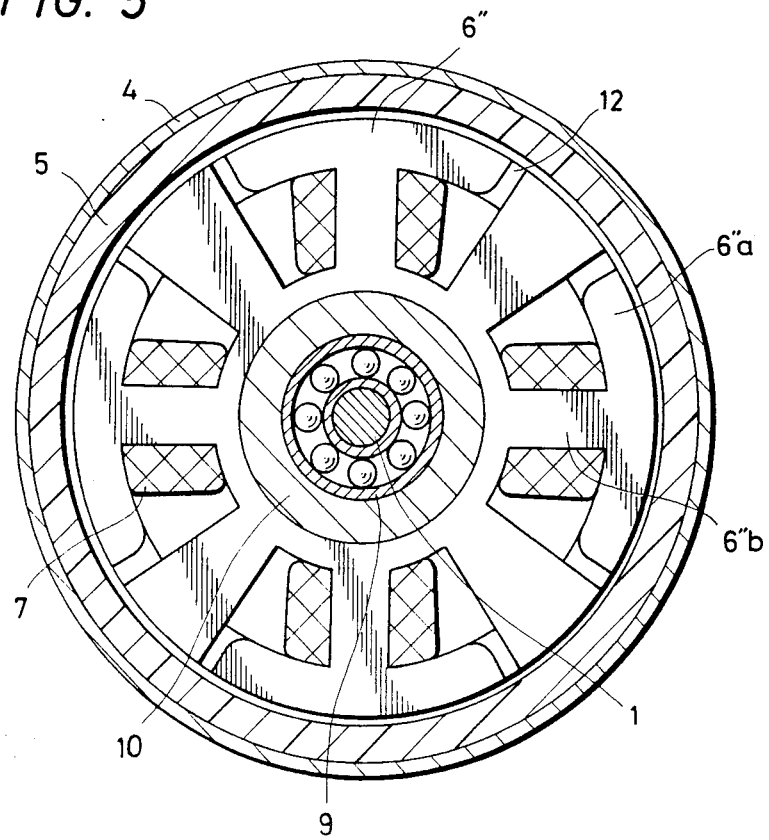
FIG. 5 is a cross-sectional view taken along line D—D' of FIG. 4.

FIGS. 4 and 5 illustrate a direct-current motor according to an embodiment of the present invention. Like or corresponding parts in FIGS. 4 and 5 are denoted by like or corresponding reference characters in FIGS. 1 through 3.

Figure 1:
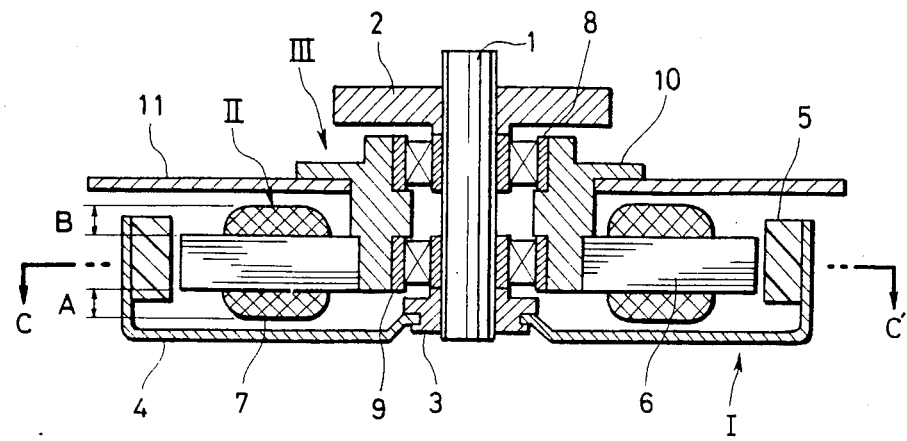
FIG. 1 is an axial cross-sectional view of a conventional direct-current motor.

As shown in FIG. 4, the direct-current motor has a rotor assembly I, a stator assembly II, and a housing assembly III, which are similar to those in the direct-current motor shown in FIG. 1 except that a second drive magnet 12 is fixed to a rotor yoke 4 and disposed in a space defined between the rotor yoke 4 and axial end surfaces of teeth or pole pieces 6"a of a stator core 6". The second drive magnet 12 is spaced axially from the stator assembly II. The second drive magnet 12 is magnetized parallel to a rotatable shaft 1. With the illustrated arrangement, a first drive magnet 5 serves to supply magnetic flux in a radial direction, while the second drive magnet 12 supplies magnetic flux in an axial direction. The air gap between the second drive magnet 12 and the pole pieces 6"a of the stator core 6" is quite small. The direct-current motor shown in FIG. 4 therefore has an additional magnetic circuit in which the rotor and the stator confront each other in an axial direction and which has an operating point at a high permeance ranging from 4 to 8 G/Qe.

Magnetic flux generated by the first drive magnet 5 passes through the stator core 6" across stator windings 7 to produce a torque. At the same time, magnetic flux enters core yokes 6″b through the pole pieces 6″a of the stator core 6″ and passes across the stator windings 7 to generate a torque. Since the torque thus generated is additive, the resultant motor starting torque is larger than that of the motor of FIG. 1 by a degree corresponding to the torque produced by the second drive magnet 12. The permeance at the operating point of the magnetic circuit is much greater than that of the motor arrangement shown in FIG. 3, and the torque generated per volume of the drive magnets 5, 12 is large. The inertia of the rotor yoke 4 is increased by a degree corresponding to the weight of the second drive magnet 12. However, since an increase in the starting torque is much higher than the inertia increase, the volumetric efficiency is quite high and high-speed starting characteristics can be ensured. Where the motor is reduced in thickness, the stator core 6″ is reduced in thickness, resulting in reduced magnetic fluxes produced by the first drive magnet 5. The magnetic flux produced by the second drive magnet 12 remains substantially unchanged even if the motor is reduced in thickness; desired volumetric efficiency and high-speed starting characteristics can be achieved even if the motor is lower in profile.

The stator core 6″ of the motor shown in FIG. 4 has the pole pieces 6″a with their ends being of substantially the same thickness as that of central portions of the pole pieces 6″a. The area of the pole pieces 6″a confronting the magnets is increased by an extent which faces the second drive magnet 12. The area of a slotted portion of the stator core is about 20% of the hypothetical area of the stator core which includes the pole pieces and slotted portion. Since the rotor assembly is pulled in one axial direction by a magnet thrust, the motor does not suffer from the problems experienced with Japanese patent publications Nos. 48-6323 and 49-34082. The stator windings 7 can be coiled on the stator core in the conventional manner.

Figure 6:
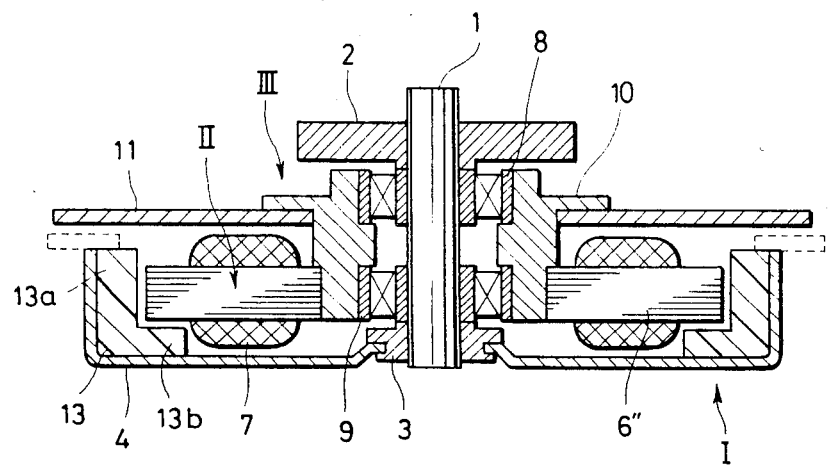
FIG. 6 is an axial cross-sectional view of a direct-current motor according to another embodiment of the present invention.

While the first and second drive magnets 5, 12 are separate from each other in the foregoing embodiment, they may be of an integral drive magnet 13 as shown in FIG. 6, which includes a first drive magnet portion 13a magnetized perpendicularly to the rotatable shaft 1 and a second drive magnet portion 13b magnetized axially of the rotatable shaft 1.

A detector coil may be disposed on the printed-circuit board 11, and an FG magnet magnetized to serve as an FG detector may be integrally disposed on the magnet 13 as indicated by the dotted lines in FIG. 6. The magnet 13 is made of synthetic resin of nylon 6 mixed with particles of barium ferrite by injection molding within a mold placed in a magnetic field.

Figure 7:
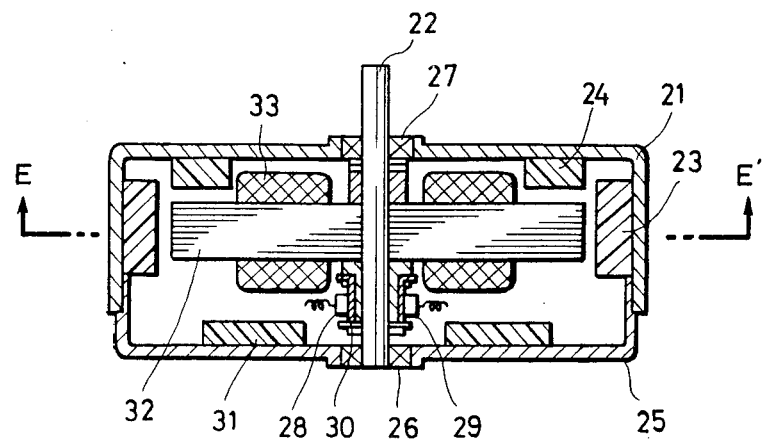
FIG. 7 is an axial cross-sectional view of a direct-current motor according to still another embodiment of the present invention.
Figure 8:
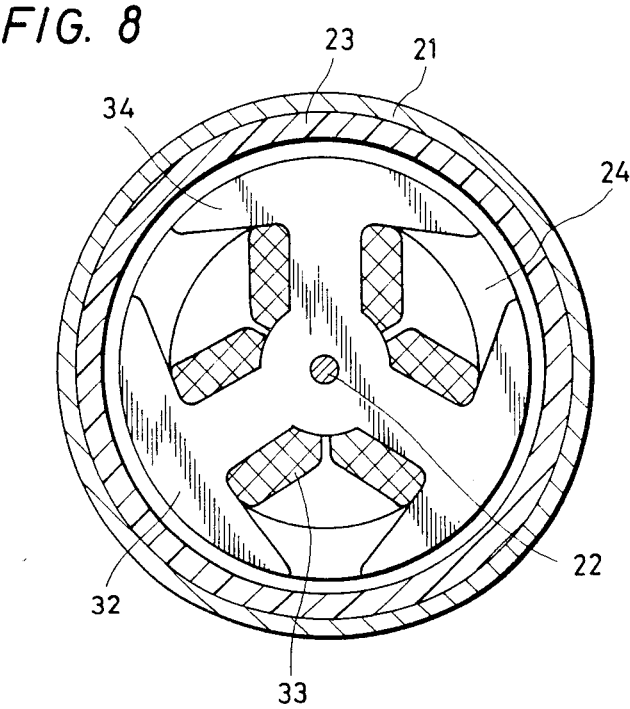
FIG. 8 is a cross-sectional view taken along line E—E' of FIG. 7.

FIGS. 7 and 8 show a direct-current motor according to another embodiment which has a commutator. The motor has a cup-shaped stator yoke 21, a first ring-shaped drive magnet 23 attached to an inner wall surface of the cup-shaped stator yoke 21 and magnetized perpendicularly to a rotatable shaft 22 in a radial direction, and a second disk-shaped drive magnet 24 attached to an inner surface of the cup-shaped stator yoke 21 which faces a rotor core (described later) and magnetized axially of the rotatable shaft 24. The motor also has a cup-shaped bracket 25 having a central oil-impregnated bearing 26, and the stator yoke 21 also has a central oil-impregnated bearing 27. The shaft 22 is rotatably supported by the bearings 26, 27. A commutator 30 is mounted on the rotatable shaft 22 and held in contact with brushes 28, 29 mounted by leaf springs (not shown) on bottom plates 31, 31 of synthetic resin disposed on a lower inner surface of the bracket 25. A rotor core 32 is fixed to the rotatable shaft 22 with rotor windings 33 coiled around the rotor core 32. The rotor core 32 is disposed in confronting relation to drive magnets 23, 24, with air gaps therebetween, which are fixed to the stator yoke 21.

The motor construction shown in FIG. 7 has the same advantages as those of the motor illustrated in FIG. 4. While the first drive magnet 23 is ring-shaped in the illustrated embodiment, it may be C-shaped. The magnet 24 may also be C-shaped. The magnets 23, 24 may be of an integral construction which may be ring-shaped or C-shaped.

Figure 9:
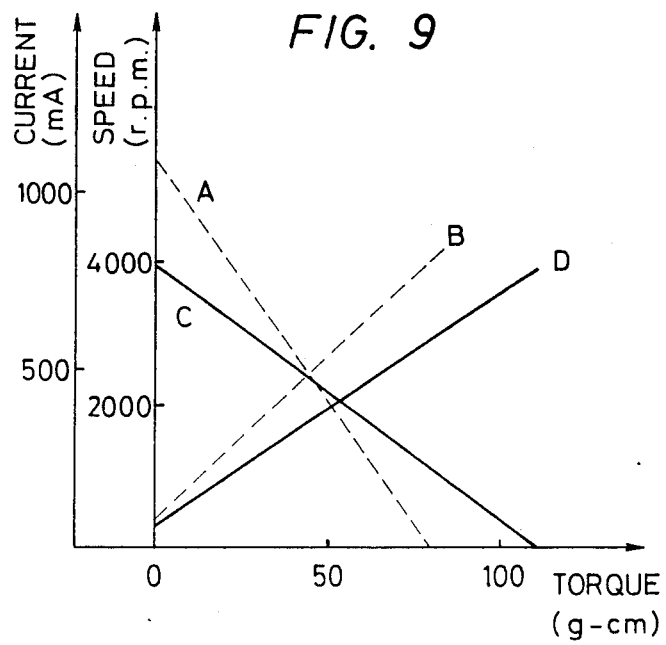
FIG. 9 is a diagram showing characteristics of a conventional direct-current motor and a direct-current motor of the invention.
Figure 10:
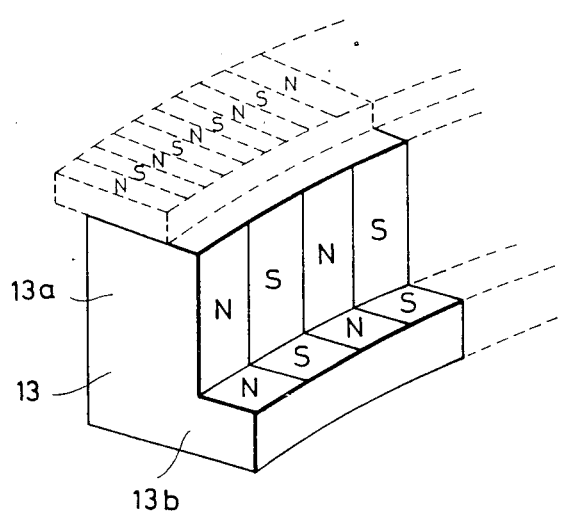
FIG. 10 is an enlarged perspective view of a magnetized magnet.

FIG. 9 shows measured values of characteristics of the conventional direct-current motor shown in FIG. 1 and the direct-current motor illustrated in FIG. 4. Denoted at A is a torque-speed characteristic curve of the conventional direct-current motor, B a torque-current characteristic curve of the conventional direct-current motor, C a torque-speed characteristic curve of the direct-current motor of the invention, D a torque-current characteristic curve of the direct-current motor of the invention. FIG. 9 indicates that the starting torque of the motor of the invention is about 1.5 times that of the prior motor, while the inertia of the rotor assembly of the motor of the invention is about 1.1 times that of the prior motor. Motor regulation of the motor of the invention clears about ½ of that of the conventional motor. Another advantage resulting from the above features is that the torque generated per unit current, that is, torque constant, is increased a little more than 30%. Stated otherwise, the current consumed to produce the same torque may be 30% smaller than it would be with the conventional direct-current motor. The rotor yoke 4 had an outside diameter of 50 mm and a thickness of 7 mm.

Figure 11:
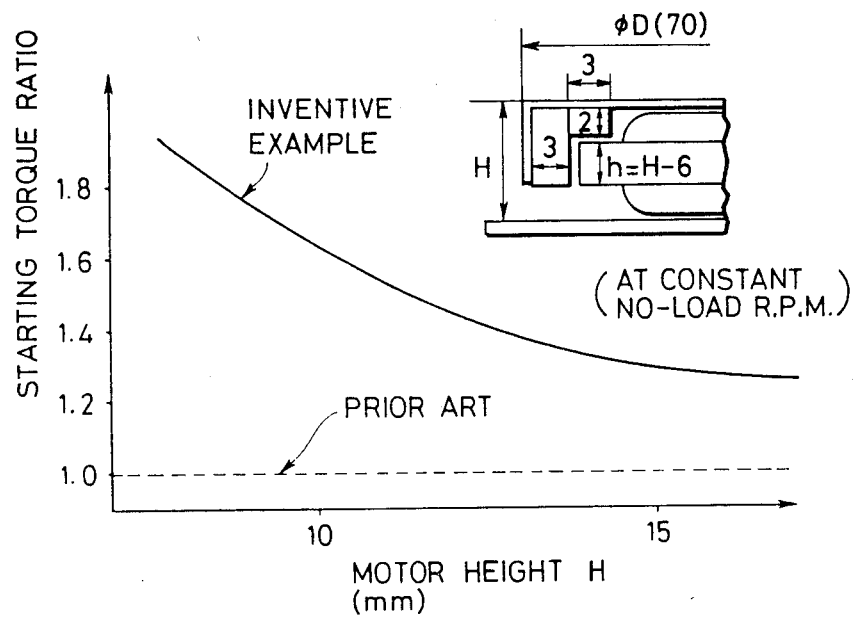
FIG. 11 is a diagram showing the manner in which the starting torque of a motor of the invention is dependent on the shape.

The present invention has the following advantages:
(a) The motor characteristics are greatly improved with a simple motor construction. Motor regulation having been reduced to about half, means that the volumetric efficiency of the motor is doubled.
(b) The rotor assembly is free from rotor vibrations since it is pulled axially in one direction.
(c) Since the second drive magnet is placed in a space which has not been used in the prior art motor, the percentage of space utilized is high.
(d) Although the second drive magnet is disposed in confronting relation to the stator core, the permeance at the operating point of the magnetic circuit can be increased since the air gap between the second drive magnet and the stator core. The volumetric efficiency of the motor is good because the torque generated per volume of the second drive magnet is large.
(e) FIG. 11 shows the manner in which the starting torque is dependent on the shape of the motor, with the starting torque of the conventional motor being regarded as 1. FIG. 11 shows that the drive magnet 12 becomes progressively effective as the motor becomes lower in profile.

Although certain preferred embodiments of the present invention have been shown and described in detail, it should be understood that various changes and modifications may be made therein without departing from the scope of the appended claims.

What is claimed is:

1. A direct-current motor comprising:
   (a) a rotatable shaft;
   (b) a cup-shaped rotor yoke mounted on said rotatable shaft;
   (c) a first drive magnet having a ring shape fixed to said rotor yoke and magnetized substantially perpendicularly to said rotatable shaft;
   (d) a stator core disposed in radially confronting relation to said first drive magnet with an air gap therebetween and having a plurality of teeth on an outer peripheral edge thereof and a plurality of radial yokes interconnecting said teeth;
   (e) stator windings disposed around said radial yokes, respectively, of said stator core;
   (f) a housing supporting said stator core and having bearings by which said rotatable shaft is rotatably supported; and
   (g) a second drive magnet having a ring shape fixed to said rotor yoke in axially confronting relation to said teeth of the stator core with an air gap therebetween and magnetized parallel to said rotatable shaft.

2. A direct-current motor according to claim 1, wherein said teeth have a radially outward circumferential surface matching the ring shape of said first drive magnet.

3. A direct-current motor according to claim 1, wherein said first and second drive magnets are of an integral construction.

4. A direct-current motor comprising:
   (a) a rotatable shaft;
   (b) a stator yoke;
   (c) a first drive magnet having a ring shape fixed to said stator yoke and magnetized substantially perpendicularly to said rotatable shaft;
   (d) a rotor core disposed in radially confronting relation to said first drive magnet with an air gap therebetween and having a plurality of teeth on an outer peripheral edge thereof and a plurality of radial yokes interconnecting said teeth and mounted on said rotatable shaft;
   (e) rotor windings disposed around said radial yokes, respectively, of said rotor core; and
   (f) a second drive magnet having a ring shape fixed to said stator yoke in axially confronting relation to said teeth of the rotor core with an air gap therebetween and magnetized parallel to said rotatable shaft.

5. A direct-current motor according to claim 4, wherein said first and second drive magnets are of an integral construction.

6. A direct-current motor according to claim 1, wherein said first and second drive magnets are disposed only radially outwardly of said core, said core being shared by said first and second drive magnets.

7. A direct-current motor according to claim 6 wherein said first and second drive magnets are disposed radially outwardly of a portion of said core having the shortest radial displacement relative to said rotatable shaft.

8. A direct-current motor according to claim 1, wherein said first and second drive magnets are disposed radially outwardly of said stator core, said stator core being shared by said first and second drive magnets.

9. A direct-current motor according to claim 4, wherein said first and second drive magnets are disposed only radially outwardly of said rotor core, said rotor core being shared by said first and second drive magnets.

10. A direct-current motor according to claim 4, wherein said teeth have a radially outward circumferential surface matching the ring shape of said first drive magnet.

* * * * *